United States Patent Office 3,523,740
Patented Aug. 11, 1970

1

3,523,740
CIRCUIT FOR MEASURING LIGHT FLUX
OF FLASHES OF LIGHT
Helmut Peter, Erlangen, and Gerhard Schmidt and Karl-Heinz Wirth, Frauenaurach, Germany, assignors to P. Gossen & Co., G.m.b.H., Erlangen, Bavaria, Germany
Filed July 24, 1968, Ser. No. 747,364
Int. Cl. G01j 1/42, 1/44, 1/46
U.S. Cl. 356—215                                11 Claims

ABSTRACT OF THE DISCLOSURE

A battery feeds through a timing device, a light measuring and a trigger circuit. The light measuring circuit has a phototransistor connected in series with a control transistor and a measuring condenser. The trigger circuit comprises a photoelectric cell which triggers a monostable multivibrator which in turn abruptly opens said control transistor when a flashlight occurs. The charge on the measuring condenser is indicated through an impedance transducer by a moving-coil indicator.

---

The present invention relates to an electronic device for measuring flashlight. More particularly, the present invention relates to a flashmeter for the use in photography wherein a photoelectric element controls charging of a measuring condenser to indicate a lux-second value of the flashlight to be measured, and wherein an electronic means is provided which measures without power consumption the voltage on this measuring condenser.

BACKGROUND OF THE INVENTION

By means of the device of the above kind it is possible to determine very accurately a correct exposure for a photographic picture which is to be taken by the aid of a flash. The exposure can be determined without subjective flashlight factors and tables for evaluation of reflection and absorption effects. On the other hand, there remains a special problem concerning the effect of the outside light which does not arise from the flash device and which should be either accurately defined or excluded.

To solve the above problem there have been developed flash measuring devices which are based on the aforementioned charging of a measuring condenser and wherein the outside light is avoided in such a way that the measurement of the light intensity is carried out during the light flux period of the flash. It is true that a small amount of the outside light is still measured together with the flashlight, nevertheless the portion of the former is negligibly small with respect to the latter. In the known flashmeter devices which measure the flashlight only, the respective measuring circuit is turned "on" at the start of the flash, and "off" at the end thereof. This switching action is accomplished mostly by means of a mechanically actuated switch, respectively shutter, which is incorporated within the flashmeter itself and the connection is carried out through a synchronization cable extending from the flashmeter to the flashing device. One of the disadvantages of these known devices resides in that the cable is cumbersome and expensive. Moreover the mechanical switch operates inaccurately and is subject to wear.

In another known flashmeter device, the charge of the measuring condenser resulting from environmental out-

2 side light is avoided by the application of a separator condenser. The voltage pulse which is generated by the flashlight to be measured can nonetheless pass through the separator condenser and charge-up the measuring condenser. In the latter arrangement the synchronization cable is no more necessary, nevertheless the control is still inaccurate since the charge of the measuring condenser due to the pulse transfer through the separator condenser is dependent on the rise speed of the flashlight. Besides, the circuit components spend too much current so that a number of relatively heavy batteries is necessary.

Finally, there have been made experiments to include the outside light into the flashlight measurement; in this case, however, the mechanical and electronical design becomes considerably complicated. In any event, the resulting indication is in the range of approximately eight aperture settings and, consequently, is difficult to read and requires the employment of multiple scales or table interpretation.

Accordingly, the primary object of the present invention is to create a flashmeter device of the above mentioned type wherein time of measurement is substantially decreased and more accurately synchronized with the illumination period of the flashlight.

Another object of this invention is to provide an electronic device having minimum consumption and, therefore, eliminating oversized batteries.

Further object of this invention is to eliminate the synchronization cable.

Still further object of this invention is to provide a device which is ready for an instant operation, which has a single easy-to-read measuring range and which is low in production cost.

Also it is an object of this invention to insure that the battery is not discharged after the measuring process has been finished.

Furthermore, the object of the present invention is to provide a device which with a minimum number of construction parts provides a maximum independence from temperature and from voltage drop caused by aging of the battery.

SUMMARY OF THE INVENTION

To accomplish the primary feature of the present invention, a phototransistor having special properties, as described hereinafter, is provided as the photoresponsive element for the flashmeter device operating on the known principle of measuring the charge of a loading condenser as a function of the light flux. A second photoresponsive element is further disposed in the area of incoming light and controls the input of a monostable multivibrator which is adapted to produce switching pulses having high flank steepness to abruptly connect the measuring circuit with said phototransistor to the power source for a period which equals approximately the illumination time of the flash.

The phototransistor which is employed in the measuring circuit must have a negligible dark current not exceeding ca. 100 nA.; further, it must pass through in a very short time interval of approximately 1 msec. a current which is proportional to the illumination intensity. Moreover, this phototransistor must be responsive in a broad range of light flux intensities, such as of at least 20–5000 lx. Finally, the phototransistor should not vary its characteristic line pattern in a temperature range of at least −10° C. to +50° C.

A distinct reading on a single scale and in the range of approximately eight aperture settings is accomplished by the fact that the indicator instrument has nearly a logarithmic response which fact is in addition stressed by the employment of a parallel connected circuit comprising a diode and resistors.

An automatic disconnection of the power source is carried out after several minutes by a circuit arrangement which has switching properties of a monostable flip-flop circuit and which passes the current only then when a pulse opens a switching transistor. This switching transistor is again turned off by a field-effect transistor when a predetermined loading voltage is attained on a time determining condenser. This voltage is detected by the field-effect transistor without any consumption of power.

BRIEF DESCRIPTION OF THE DRAWING

The invention is illustrated by way of example in the accompanying drawings, in which:

Referring now to FIG. 1, a battery 1 supplies power via a normally closed switch contact 12 to a measuring circuit which consists of an in-series connected combination of a control transistor 2, a silicon phototransistor 3 and a measuring condenser 4. The base of the control transistor 2 is at the same time connected to a control circuit consisting of a monostable multivibrator 5 which is also fed by the battery 1 and which comprises a silicon photoresponsive element 6 that is disposed in the same plane as the silicon phototransistor 3. A current amplifying impedance transducer 7 is connected in parallel to the measuring condenser. The output signal thereof is indicated by a moving-coil instrument 8.

Figure 1:
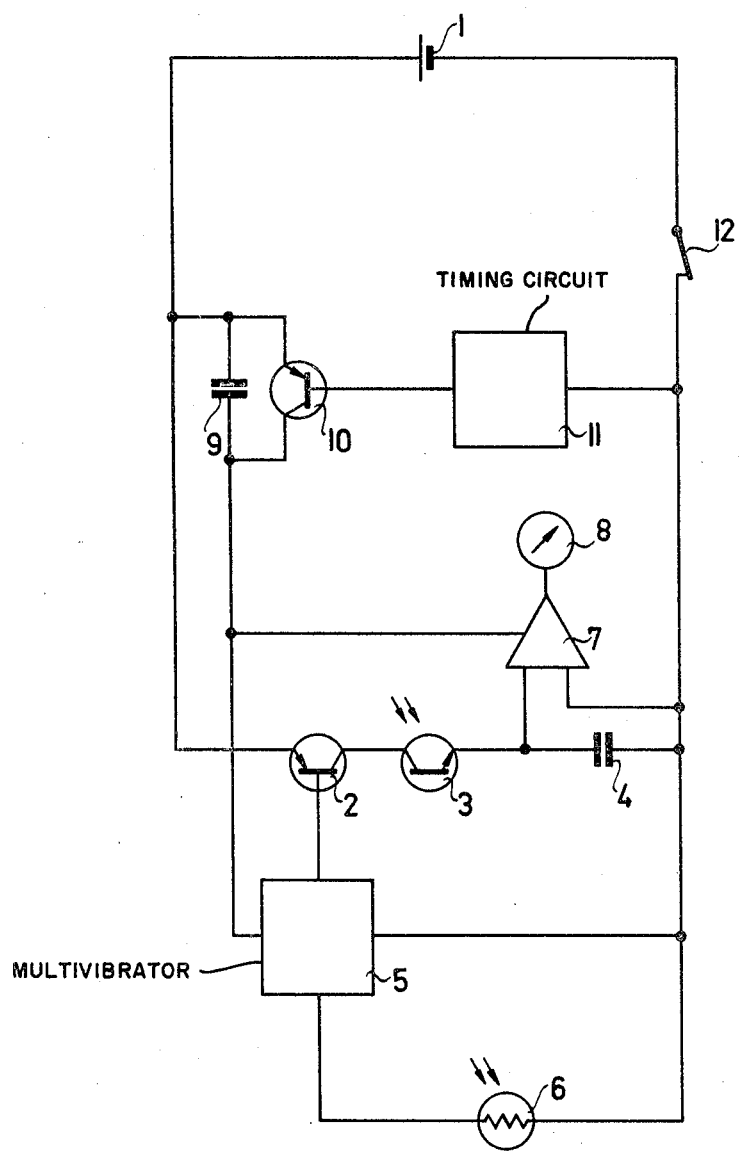
FIG. 1 is a simplified diagram of the flashmeter of the present invention.

Furthermore, an automatic timing circuit is connected to the switch contact 12 in parallel to the battery 1. This circuit consists of a loading condenser 9, of a switching transistor 10 and of an operational time defining arrangement 11 controlled by the switching contact 12.

Figure 2:
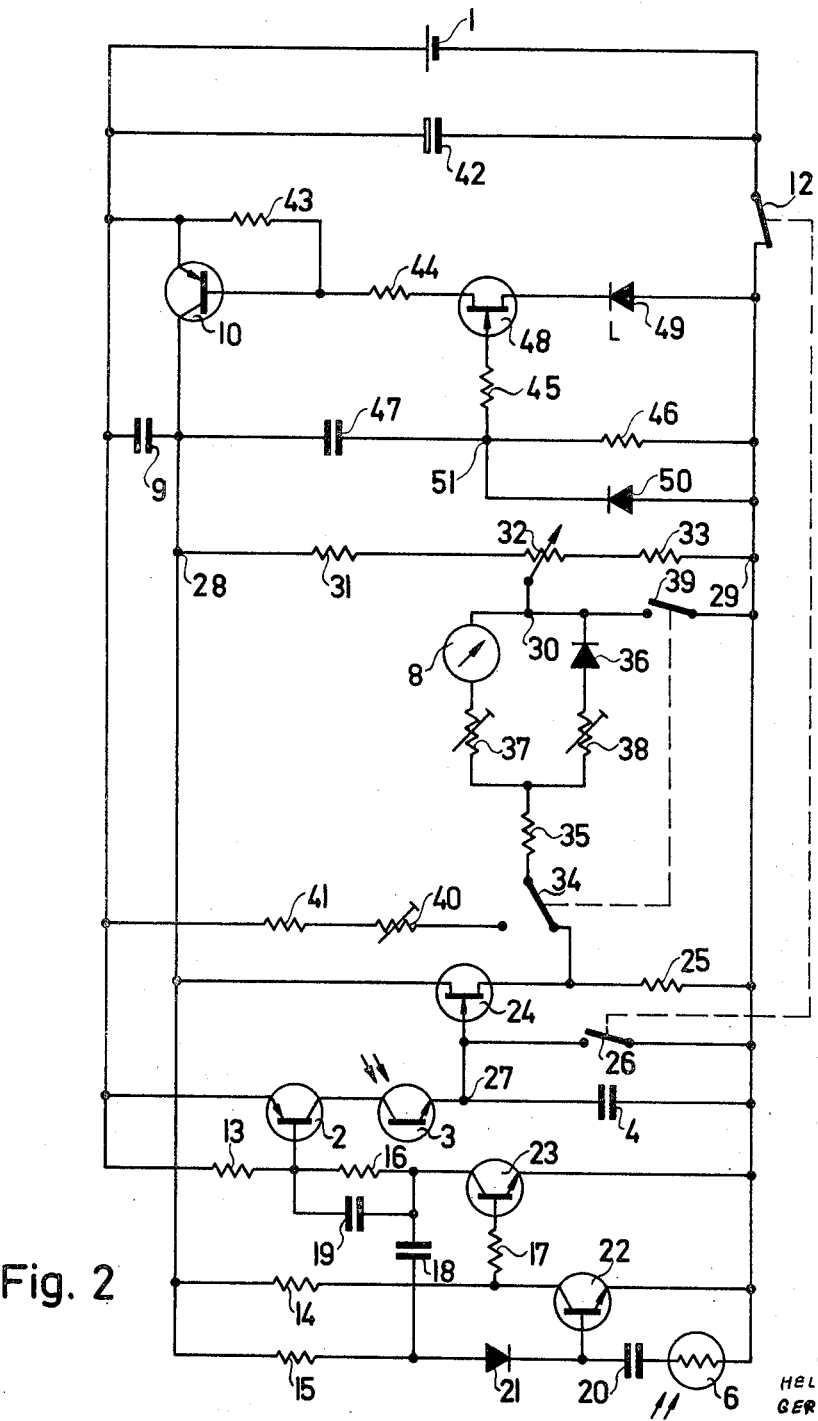
FIG. 2 is a schematical diagram of one embodiment of the present invention.

As indicated in a detailed circuit diagram in FIG. 2, the monostable multivibrator 5 comprises resistors 13 to 17, condensers 18 to 20, one diode 21 and the transistors 22 and 23. The impedance transducer 7 which is connected across the measuring condenser 4 comprises a field-effect transistor 24 connected with a resistor 25 to form a source-follower circuit. The latter resistor 25 is connected to one terminal of the measuring condenser 4, whereas the gate of the field-effect transistor 24 is connected to the opposite terminal. The two condenser terminals are momentarily short-circuited by a switch contact 26 which is coupled with the normally closed switch contact 12. By application of the impedance transducer, a high impedance input is provided for the indicator circuit. Consequently, in connection thereof with the measuring condenser a very large time constant results and the voltage of the charged condenser decreases very slowly.

The voltage drop occurring on the resistor 25 is compensated by a bridge circuit having corner points 27 to 30.

A field effect transistor 24 is connected between the corner points 27 and 28; a resistor 25 between the points 27 and 29; a resistor 31 and a portion of a variable resistor 32 between the points 28 and 30; and a resistor 33 and the remaining portion of the variable resistor 32 between the points 29 and 30. The diagonal leg between the points 27 and 30 comprises a switch contact 34 normally switched to the measuring circuit position, a resistor 35 connected in series with a parallel connection of a moving-coil instrument 8 in series with an adjustable resistor 37 and a diode 36 connected in series with an adjustable resistor 38. The above described arrangement of the diagonal leg of the bridge intensifies the logarithmic response of the movable-coil indicator 8. By means of the switch contact 34 which is coupled with the switch contact 39, the measuring circuit together with the transistor 24 can be switched-over from the measuring position to a checking position and, at the same time, the switch contact 39 bridges the resistor 33 and a portion of the variable resistor 32 to connect the indicator circuit directly to one pole of the power source 1. The checking circuit is closed via resistors 40 and 41 to the second pole of the power source 1 whereby the instrument 8 shows the condition of the battery voltage. The bridge circuit is subsequently adjusted by setting up the remaining portion of the resistor 32 according to the indicated battery condition. For this purpose the variable resistor 32 can be provided with a control knob, for example.

Finally, the battery 1 is shunted by a storage condenser 42 which, irrespective of the battery condition, insures for a short time a minimum current supply. By closing the switch contact 12 a pulse from the battery voltage is generated. This pulse actuates the automatic timing circuit 9, 10 and 11. At the same time, by means of the contact 26 which is mechanically coupled with the switch contact 12, the latter is momentarily closed so that the measuring condenser 4 is discharged and prepared for the measuring process.

In the embodiment as shown in FIG. 2, the automatic timing circuit consists of the bridging condenser 9 which is disposed in parallel to the emitter-collector path of the switching transistor 10, and of an operational time forming arrangement comprising resistors 43 to 46, further a condenser 47, a field-effect transistor 48, a Zener diode 49 and a diode 50. Condenser 47 is connected in series with the resistor 46 between the collector of the transistor 10 and the minus pole of the battery 1. Resistor 46 is bridged by a diode 50, whereby between the base of the transistor 10 and the minus pole of the battery a series connection comprising the resistor 44, the field-effect transistor 48 and Zener diode 49 is provided. The gate of the field-effect transistor 48 is connected via a resistor 45 with the knot point 51 between the condenser 47 and resistor 46. Besides, the emitter of the transistor 10 is connected with the base thereof through a resistor 43.

The above described timing arrangement operates in the following way: If the switching contact 12 is momentarily opened, a positive pulse arises which by means of the above mentioned timing automatic provides the current supply for the entire device.

Simultaneously the switch contact 26 is momentarily closed and opened again so that the measuring condenser 4 prior to the beginning of the measurement is discharged. Now, when the indication of the moving-coil instrument 8 is set to zero by setting of the adjustable resistor 32, the bridge having the corner points 27 to 30 is balanced and the flashmeter is ready for measurement. As long as no flash has been ignited, the photoelectric element 6 delivers no pulse to the monostable multivibrator 5, the transistor 2 is blocked and no current flows through the measuring circuit. However, as soon as a flash occurs, the photoelectric element 6 generates a trigger pulse which reverses the condition of the multivibrator 5. By this action the transistor 2 becomes conductive and the measuring circuit is in the operative state. Since simultaneously with the photoelement 6 also the phototransistor 3 is illuminated, a current which is proportional to the flashlight intensity flows into the measuring condenser 4. As a result, the latter is charged to a voltage which corresponds to the product of the illumination intensity times illumination period and, therefore, to the lux-second value to be measured. Shortly upon the expiration of the illumination period the multivibrator 5 returns atomatically to its initial state again and the transistor 2 disconnects the measuring circuit from the battery.

The switching period of the multivibrator 5 is for this purpose adjusted so that the transistor 2 conducts only a little bit longer than the illumination time of the measured flashlight. The monostable multivibrator 5 is designed as to be sufficiently sensitive to respond to as low light intensities as 1/10 of the minimum measured value. By this arrangement it will be secured that the measuring circuit becomes turned on just at the beginning of the step flank of the flashlight pulse and after the cessation of the flash it becomes reliably disconnected. The measuring condenser upon termination of the illumination period is charged by a voltage which is proportional to the intensity of the flashlight. This voltage is practically wattless transformed by means of the impedance transducer 7 to the moving-coil instrument 8 which executes the indication. After several minutes of operational time the power source is automatically disconnected from the measuring and trigger circuits due to the action of the automatic timing circuit which operates as follows: Whereas the measuring circuit is inoperative because of no incoming flashlight, the indicator circuit, the monostable multivibrator as well as the automatic timing unit are initially disconnected from the battery due to the blocking action of the switching transistor 10. However, if the switching contact 12 is momentarily opened and again closed, a positive voltage pulse resulting from the switch return is transferred from the battery via condensers 9 and 47 to the knot point 51 and therefrom via the protective resistor 45 to the gate of the field-effect transistor 48. The latter becomes conductive and causes its drain current to flow through the base-emitter path of the switching transistor 10. The transistor 10 starts conducing he control current and connects the battery 1 with one terminal of the condenser 47 and therefrom with the subsequent circuits. Since condenser 47 is initially discharged, it transfers the full voltage rise on the gate of the field-effect transistor 48 and the latter becomes switched on. The Zener diode 49 which is connected to the source terminal of the field-effect transistor 48 secures a definite working point for the same. Now, the condenser 47 is through the resistor 46 charged to the full voltage of the battery. By the appropriate selection of the switching threshold by the aid of the Zener voltage and of the gate-source voltage of the transistor 48, the timing circuit operates in the steep section of the loading characteristic. Consequently, the variations of the working voltage caused by aging of the battery are substantially eliminated.

As soon as the charge on the condenser 47 is increased, the potential at the point 51 and, therefore, on the gate of the field-effect transistor becomes more negative than the stabilized source voltage, the drain current decreases, the switching transistor starts blocking again and the voltage behind the latter diminishes. This voltage breakdown is transferred as a negative pulse via the condenser 47 to the gate and switches "off" the field-effect transistor 48 so that after several minutes this circuit returns abruptly to its original "off" state and remains in that state until a new positive pulse via the condenser 9 starts the timing process anew. Upon blocking of the switching transistor 10, the charge stored in the condenser 47 flows through the diode 50 into the coupled circuits.

If during the actuated period of the automatic timing circuit the switching contact 12 is temporarily disconnected, the transistor 10 starts blocking and the above described switching process is reinitiated via aforementioned feedback path. Simultaneously, the condenser 47 is discharged through the diode 50 and the positive pulse resulting from the turning-on of the contact 12 begins a new circuit closing interval.

The advantages of the above described circuit configuration reside above all in the fact that the accuracy of the measurement is substantially increased in comparison with the devices known from prior art. The circuit structure as well as the manufacture thereof is relatively simple and a moderate-in-price measuring instrument can be employed. Further, a low-capacity battery can be used since any ineffective discharge is reliably avoided. The resulting device is small in size, light and adapted for an instant function. The scale is easy to read and since no synchronization cable is necessary the device can be applied with advantage in large studios. Naturally, this electronic flashmeter can be utilized also for measuring flashes which are not intended for photography provided that the illumination period of those flashes is shorter than the measuring range of the device.

In another embodiment of the present invention it is also possible to modify the device for measuring light pulses having an unknown duration. In this case, the measuring circuit is not disconnected automatically after a predetermined time period, but an additional trigger circuit is provided, which turns off the measuring circuit when the measured light pulse decreases below a predetermined minimum light intensity.

What is claimed is:

1. An electronic flashmeter comprising a D.C. power source, a first switch means, a light flux measuring circuit comprising a first photoresponsive element, a control means, and a measuring condenser, said photoresponsive element being connected through said control means to said measuring condenser to charge the latter from said power source proportionally to the light flux incoming thereupon, indicator means coupled in parallel to said condenser; a measuring circuit trigger means having a second photoresponsive element to turn on said control means when the flashlight occurs; and a timing means actuated by said first switch means for blocking said power source upon expiration of a predetermined length of time.

2. The flashmeter according to claim 1 wherein said first photoresponsive means is a phototransistor having a minimum dark current and passing during the flashlight period a current which is proportional to the illumination intensity.

3. The flashmeter according to claim 2 wherein said control means is a transistor having its collector-emitter path connected in series with the collector-emitter path of said phototransistor and the base thereof coupled to said trigger means.

4. The flashmeter according to claim 3 wherein said indicator means comprises a second switch means adapted to short-circuit said measuring condenser prior to the measurement, an impedance transducer connected in parallel to said measuring condenser for providing a large time constant therewith and to connect the latter to an indicator instrument.

5. The flashmeter according to claim 4 wherein said impedance transducer comprises a field-effect transistor having a source-follower circuit configuration.

6. The flashmeter according to claim 5 wherein said field-effect transistor forms a leg of a resistance bridge and said indicator instrument is connected diagonally within said bridge.

7. The flashmeter according to claim 6 wherein said indicator instrument is coupled with a resistor-diode combination to insure a substantially logarithmic reading.

8. The flashmeter according to claim 6 further comprising a switch-over means connected between said indicator means and said power source for optionally checking the voltage of the latter.

9. The flashmeter according to claim 8 further comprising a power storage condenser connected in parallel to said power source to insure a minimum operative current supply.

10. The flashmeter according to claim 1 wherein said timing means comprises an electronic switching arrangement adapted for being switched on by the pulse from said first switch means and connecting for a predetermined operational time period said power source with said measuring and trigger circuit.

11. The flashmeter according to claim 1 wherein said trigger means further comprises a monostable multivibrator having short rise time of output pulses, said multivibrator being controlled by said second photoresponsive means to abruptly open said control means.

References Cited

UNITED STATES PATENTS 2,521,890 9/1950 Alexander.
3,147,680 9/1964 Stimson.
3,418,479 12/1968 Schmitt.
3,445,170 5/1969 Dietrich et al.
3,464,773 9/1969 Waz.

RONALD L. WIBERT, Primary Examiner
W. A. SKLAR, Assistant Examiner

U.S. Cl. X.R.

250—210; 356—218, 226